United States Patent [19]

Sobel

[11] 3,743,773

[45] July 3, 1973

[54] IMAGE DISPLAY PANEL

[75] Inventor: Alan Sobel, Evanston, Ill.

[73] Assignee: Zenith Radio Corporation, Chicago, Ill.

[22] Filed: Mar. 31, 1972

[21] Appl. No.: 240,060

[52] U.S. Cl. .............. 178/7.3, 340/166 EL, 315/169
[51] Int. Cl. .............................................. H05b 33/26
[58] Field of Search ........................ 178/5.2 R, 5.2 D, 178/5.4 CD, 5.4 BD, 5.4 C, 5.4 EL, 5.4 ES, 5.4 E; 340/166 EL; 315/169

[56] References Cited

UNITED STATES PATENTS

| | | | |
|---|---|---|---|
| 3,512,041 | 5/1970 | Delmasso | 315/169 |
| 3,070,701 | 12/1962 | Wasserman | 340/166 EL |
| 3,600,798 | 8/1971 | Lee | 178/7.3 D |
| 3,647,958 | 3/1972 | Sobel | 178/7.3 D |
| 3,609,747 | 9/1971 | Ngo | 315/169 |
| 3,673,572 | 6/1972 | Sliva et al. | 315/169 |

OTHER PUBLICATIONS

"Flat-Screen Television Takes Two Giant Steps Forward," by L. Mirando & L. Sliker, Electronics, May 25, 1970 pages 112–117.

*Primary Examiner*—Gareth D. Shaw
*Attorney*—John H. Coult et al.

[57] ABSTRACT

A panel displays an image formed of picture elements distributed in a matrix. At each picture element position is a light-display device such as an electroluminescent cell. A group of mutually-dispersed switches are located at each of the display devices with each switch within a group being responsive to a certain field strength for energizing its associated display device. Video signal is supplied together with position-selection signals. Different ones of the groups of switches are selectively addressed in response to the position-selection signals. Finally, in response to the video signal, each addressed group of the switches is subjected to a field correspondingly dispersed among the switches in an amount proportional to the picture level.

22 Claims, 14 Drawing Figures

IMAGE DISPLAY PANEL

BACKGROUND OF THE INVENTION

The present invention pertains to image-display panels. More particularly, it relates to image-display panels having a flat, thin overall shape.

Flat image-display apparatus has long been sought. One approach has been that of using modified electron trajectories in a cathode-ray tube so that the evacuated envelope may have substantially reduced depth. Other approaches have sought to make use of solid-state light generation or light control. Thus, solid-state diodes, electroluminescent cells, liquid crystals and mechanical shutters have been distributed over display matrices and selectively activated individually in order to create the display of an image. Some of these prior devices have found a degree of success, particularly for the display of simple stationary images. However, they often leave much to be desired in complexity of associated peripheral addressing systems or in ability adequately to reproduce an image with a sufficient range of gray scale or contrast.

In my prior U.S. Pat. No. 3,647,958, issued Mar. 7, 1972, and assigned to the same assignee as the present application, there is described and claimed a different approach which increases available contrast by including a plurality of switches at each image point. Within each group of switches associated with a given picture element, the individual different switches exhibit respectively different firing levels or thresholds in response to a control potential. One practical difficulty with the latter specific construction is that of controlling, during production, a deliberately programmed non-uniformity of switching level across the array of switching systems.

It is, accordingly, a general object of the present invention to provide a new and improved image-display panel which overcomes the aforenoted limitations of prior systems while at the same time improving upon the panel specifically described in the aforementioned patent.

Another object of the present invention is to provide a new and improved image-display panel that permits the attainment of still further increase in production yield.

A specific object of the present invention is to provide a new and improved species deriving from the basic concepts of the aforesaid patent.

In accordance with the present invention, a panel for displaying an image is formed of picture elements distributed over the panel in a matrix. An effective plurality of light-display devices are individually disposed at respective different ones of the picture element positions, with each device displaying light in an amount proportional to its level of energization. A respective different group of mutually-dispersed switches is located at and associated with each of the light-display devices. Each switch within a group is responsive to a predetermined field strength for energizing its associated light-display device. Included are means for supplying a video signal composed of amplitude-varying picture information together with position-selection signals. In response to the position-selection signals, different ones of the groups of switches are selectively addressed. Finally, in response to the video signal, each addressed group of the switches is subjected to a field correspondingly dispersed among the switches in an amount proportional to the respective level of picture information.

BRIEF DESCRIPTION OF THE DRAWINGS

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

FIG. 1 is a diagram of an image-display panel together with an addressing system;

FIG. 2 is a fragmentary perspective view of one embodiment of an image-display panel;

FIG. 3a is a fragmentary cross-sectional view taken along the line 3—3 in FIG. 2;

FIG. 3b is an electric field plot useful in explaining the operation of the embodiment of FIG. 3a;

FIGS. 3c, 3d and 3e are fragmentary cross-sectional views depicting alternative structures of one detailed portion of that shown in FIG. 3a;

FIG. 3f is a fragmentary plan view taken along the line 3f—3f in FIG. 3e;

FIG. 4a and 4b are fragmentary cross-sectional views showing further alternatives to the structure of FIG. 3a;

FIG. 7 is a partly schematic and partly cross-sectional view illustrating certain principles involved in connection with an alternative form of the structure of FIG. 6; and FIG. 7b is a fragmentary cross-sectional view in which the principles illustrated in FIG. 7a are incorporated into a physical embodiment.

FIG. 1 depicts an image-display panel having a plurality of elongated conductors or column electrodes 10 laterally spaced apart across one surface of the panel. On the rear side of the panel (not shown) are another series of elongated conductive elements or row electrodes also laterally spaced apart across the panel but oriented orthogonally to column electrodes 10. An element scanner 11 selectively addresses different ones of column electrodes 10 with individual control signals. In this case, these control signals include an input signal component that is proportional in amplitude to respective different levels of picture information derived from a source 12 of video. At the same time, a line scanner 13 addresses different ones of the row electrodes with enabling signals.

Figures 1, 2, 3A, 3B, 3C, 3D, 3E, 3F:
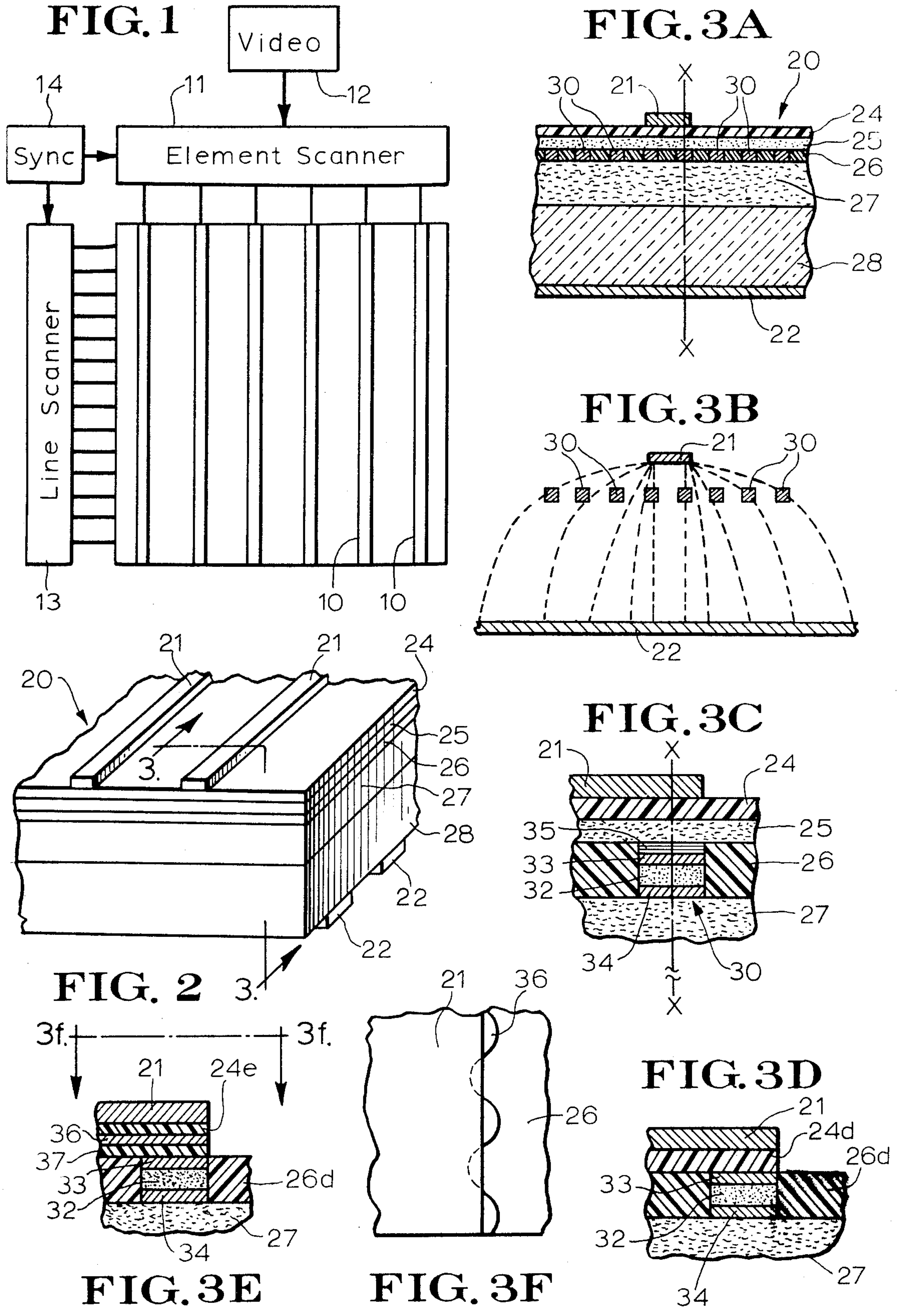

Scanner 11 responds to column-selection signals from a synchronizer 14 which also supplies row-selecting signals to scanner 13. The addressing of any one row conjointly with the addressing of a respective column effects selection of the intersection of that row and column. Assuming a light-display element to be located at that intersection, its level of energization depends, in this version, upon the amplitude of the control signal applied to that column, and that amplitude, in turn, corresponds to the level of the picture information from video source 12. Prior panels of this kind are known wherein the panel itself includes a layer of electroluminescent material disposed between the mutually-crossed arrays of conductors. Each intersection, where one conductor spatially "crosses" another, defines the location of a picture element.

Scanners 11 and 13 may take any of a number of known forms. One conventional approach is to include in each scanner a shift register that is stepped from each one output to the next by a series of gating pulses in turn initiated by a timing clock that is synchronized with the signals from synchronizer 14. For use as a television display, scanner 13 selects rows sequentially in succession from top to bottom and, while each such row is selected, scanner 11 sequentially selects successive ones of column 10 from left to right. Upon conclusion of one complete scan of all elements in the panel, the synchronizing information resets the scanners so that the scanning process begins anew. Thus, the image as viewed over a period of time represents a succession of frames within each of which the video information is displayed line-by-line, just as in the conventional technique of image scanning upon the face of a cathode-ray tube. In the form illustrated in FIG. 1, the video component is applied sequentially across each row. In an alternative and well-known approach all columns in a row are addressed simultaneously. To that end, scanner 11 may include a bank of storage elements into which each line of video information is first stored. When a row then is selected, the bank is "dumped" to distribute the stored video components into all of the respective columns at the same time.

Whatever the form of addressing, there also is flexibility in choosing the nature of the different addressed signals. For example, the signal to the row electrodes might simply be the completion of a ground return, while the entire selection potential and the video components are applied to the column electrodes. On the other hand, there may be mixed selection potentials and video modulation on both rows and columns. For addressing an entire row simultaneously, the video modulation is fed to the columns while the selection potential preferably is divided between the rows and columns. In general, two functions are required to activate any particular picture element. The first is selection, that is, the addressing or selecting of the specific picture element or elements to be acted upon. The selection process requires a well-defined threshold or nonlinearity at each picture element by reason of which potentials below the threshold do not perturb the state of the element. The second function is modulation, the delivery of assigned signal amplitudes to the selected picture elements in order to produce the desired light outputs. For displays which do not have gradations in output level, selection and modulation may be combined. To reproduce gradations in contrast or color, however, independently controllable modulation is required.

Although it might complicate any particular arrangement of the FIG. 1 approach, it is to be further noted that the video components may be supplied to each effective picture element by a separate array of conductors or equivalent addressing means. In any event, the addressing may be according to a repetitive program as in television or be selective upon command. Moreover, the matrix pattern of FIG. 1 has been described in terms of its orthogonally related rows and columns in order to clarify the presentation by reference to such a well-understood form of array. However, such language is intended to embrace such equivalent display patterns as those used in plan-position indicators and similar read-out apparatus.

As shown in FIGS. 2 and 3*a*, an image display panel 20 similarly includes a plurality of conductive column electrodes 21 distributed in one direction across one major surface and a plurality of conductive row electrodes 22 distributed in the orthogonal direction across the opposite major surface of the panel. Sandwiched between the opposing arrays of electrodes are a layer 24 of electrically insulating material, a film 25 of anisotropically-conducting material, a perforated sheet 26 also of electrically insulating material, a slab 27 of electroluminescent material and, finally, a glass substrate 28 to which row electrodes 22 are affixed. Situated within each of the perforations or apertures in sheet 26 is a switch 30. Each individual switch is characterized by being normally non-conductive but quickly becoming conductive when subjected to a predetermined electric field strength. When in its conductive state, the field traversing the switch energizes the directly adjacent portion of electroluminescent slab 27. Thus, the electroluminescent material in itself constitutes an effective plurality of light-display elements, each different one individually being associated with a respective different one of switches 30. Moreover, all of the different light-display elements under the control of a given one of column electrodes 21, in association with a similarly given one of row electrodes 22, together constitute a single light-display device defining a picture element and exhibiting a level of light output which is dependent upon the number of its associated switches 30 that are in a conductive state at any given instant of time.

FIG. 3*b* exemplifies the manner in which the group of switches 30 is controlled in operation by means of the non-uniform electric field extending between the column electrode 21 and the row electrode 22 which together serve to define the location of a given picture element. With but a comparatively small potential difference between electrodes 21 and 22, a significant electric field appears only more or less directly beneath electrode 21. When that field reaches the switch threshold level, those of the switches closest to electrode 21 are first actuated so as to become conductive. As the potential difference between electrodes 21 and 22 is increased, the field disperses or spreads among switches 30 and ultimately encompasses all of the switches in the group associated with electrode 21 at a strength sufficient to activate the switches. Thus, as the field strength between the intersecting electrodes increases in correspondence with an increased applied video level, there is a proportional increase in the number of switches 30 that are rendered conductive. Correspondingly, there is a like increase in the total level of energization of the light display element associated with the group of switches under the influence of electrode 21 in FIG. 3*a*. In this way, it can be seen that there are a multiplicity of energizing switches for each image point and that the number of switches enabled at any given instant depends upon the applied video level. Moreover, the basic control mechanism is that of degree of dispersal of the non-uniform field which, in turn, is proportional to the video level. In this connection, however, it is to be observed that it is a selection potential which controls the field strength at any given switch so as to enable it to become conductive. In turn, the modulation potential determines which switches are fired at each picture element position. At the same time, the values should be chosen so that a selection signal on only one of the associated row or column electrodes, together with maximum video modulation, is not productive of a potential above the threshold level of any of the switches in the group at that picture element position.

As indicated, light generation in the panel of FIG. 3*a* is obtained by utilizing an electroluminescent material. Accordingly, row electrodes 22 are transparent. Moreover, the row electrodes may be either on the exterior or interior surface of substrate 28. As is well known, electroluminescent cells generate light when subjected to an electric field that exceeds a predetermined threshold level. Usually, the field is developed by the application of an alternating potential, although sometimes a unidirectional potential or a combination of alternating and unidirectional potential is employed. Display elements other than electroluminescent cells may be utilized in the embodiments herein disclosed. For example, alternative light generators include injection-luminescent diodes and gas-discharge cells. For light modulation instead of generation, suitable alternative elements include orientable suspended particles, liquid crystals and electro-mechanical shutters. In any case, the particular kind of light display element employed herein is one which responds to energization from an external source to display light. There may be one integral display device for each group of switches, or the display device may be, in effect sub-divided as by using a plurality of display elements at each picture element position. In the latter case, there may be one separate display element for each different switch.

Each of switches 30 exhibits a predetermined firing level in response to the applied field. While that firing level as between the different switches in a given group may be the same for all, some variation from switch to switch within a group may be tolerated and even advantageous in tending to "wash out" otherwise visible graininess or other analogous effects. In any event, the ultimate light output from any given display device is proportional to the number of switches which at any given instant are conductive. At the same time in the version shown, the total light output or brightness of each light display device is subject to a cumulative effect which increases the contrast ratio to an amount even greater than the number of switches per image point. This occurs because each of the electroluminescent subelements is in itself also voltage dependent. The first one excited produces still more light as the field spread and strength is increased to activate the second one, and so forth.

Switches 30 need not be of any particular kind, so long as, individually or in combination with their associated light-control device, they are effectively dispersed with reference to the dispersal characteristic of the applied field. Moreover, the switching functions may be incorporated into the light-control elements themselves. For example, a gas cell exhibits a threshold response to an applied field. Accordingly, a plurality of such cells may be physically dispersed relative to the applied field.

As illustrated, however, each of the switches is physically distinct from its associated light-control device. Ovonic switches, constructed of amorphous semiconductor material, are appropriate. Such switches are described in an article by George Sideris entitled "Transistors Face an Invisible Foe", which appeared in *Electronics*, pages 191–195, Sept. 19, 1966, and in an article entitled "Amorphous-Semi-Conductor Switching" by H. K. Hanisch which appeared at pages 30–41 of *Scientific American* for September, 1969. Each ovonic switch may simply be a small layer or dot of a glass-like material deposited upon an electrode. Differences in material constituents or in thickness permit the ovonic switches to exhibit different threshold levels. The threshold voltage apparently is a function of the energy band-gap structure of the material.

Whatever the form of switch selected for use in display panel 20, it is preferable that the switches either alone or in combination with the parameters of the associated elements, exhibit bistability in the sense that, once fired, each switch continues to pass current from a source of substaining voltage to the light-control device as long as a certain minimum potential is maintained. Both ovonic threshold switches and gas cells exhibit this characteristic. Accordingly, a sustaining potential sufficient to energize the light display device may exist continuously across conductors 21 and 22 and be of a value which may be only slightly below that required to develop the minimum field level necessary to fire any of the associated switches. On the other hand, the level of sustain potential required may be substantially less than the potential required to activate the switch initially. Using alternating-current excitation for a breakback type of switch associated with a capacitor, e.g., an ovonic switch in series with a capacitive electroluminescent cell, the sustain level required may be only a fraction of the control pulse amplitude used to "fire" the switch. In any event, the desired numbers of switches may be actuated simply by superimposing a control pulse upon the sustaining potential so as to raise the total potential level above the desired threshold level and result in the desired degree of field spread. Ovonic memory switches similarly may be employed; these require the affirmative application of an appropriate turn-off pulse.

DESCRIPTION OF THE PREFERRED EMBODIMENT

In operation, then, a substaining voltage may be maintained throughout each frame interval between all of the leads connecting scanner 11 (FIG. 1) to the columns and the leads connecting scanner 13 to the rows. The addressing systems thus permit continuous device energization following the application of the video component of a control signal. That is, each of the light-display devices that has been actuated, in whole or in part, during the most recent frame interval remains in that state by virtue of the sustaining voltage continued during the same interval. Therefore, each of the display devices exhibits persistence or storage, as a result of which the overall image is substantially brighter than would be the case if light were produced only at the instant of addressing each individual display device. Correspondingly, line scanner 13 may serve the additional function of extinguishing all of the display devices in each row shortly before that row is addressed anew during the succeeding frame. To this end, it is necessary that a shift register or other row-addressing device break the connection to each row before that row is again selected.

Alternatively, it may be desirable in some applications to avoid mixing of the sustain voltage with the combination of the selection and modulation potentials. In that case, the sustain voltage may, for example, be applied only during the horizontal retrace interval (standard television definition), while the selection and modulation potentials are applied during trace time. On the other hand, stored video modulation may be written into an entire line or row during horizontal retrace, with the sustain potential then being applied throughout at least most of the trace interval.

Insulating layer 24 serves, first of all, to insure against direct conductivity between column electrode 21 and the ones of switches 30 located directly beneath electrode 21. At the same time, layer 24 provides an increased dielectric constant in the field path; this may be used to improve the transfer characteristic as between light output and input signal. For these purposes, the insulating layer need only be approximately of the same width as that of electrode 21. When layer 24 does not extend over all of the switch systems in a group, a high-resistence layer may, in accordance with one alternative, be disposed to overlie the remainder of the group of switches so as to modify the field distribution. On the other hand and as actually shown in FIG. 3*a*, insluating layer 24 is extended out over the entire area covering all of the switches 30. With this construction, the thickness of insulating layer 24 may be tapered or otherwise varied as desired in order to tailor the overall transfer characteristic toward the ultimate end of obtaining whatever contrast scale is most effective for any particular combination of type of switch and type of light output device.

Anisotropic film 25 is not essential to achievement of the basic principle of distributing swtiches 30 throughout a non-uniform field and selecting the number of switches to be activated at any given instant by means of field dispersal. When used, however, film 25 exhibits a finite ratio between its resistance in the plane defined by the film and its resistance in the direction normal to that plane. This feature results in an increase in taper of the field gradient as measured in the direction of distribution of switches 30. Moreover, the resistance that film 25 does present in the direction normal to its plane also guards against catastrophic failure of an entire display device. That is, should any one of switches 30 break down so as to remain conductive regardless of applied field level, the included series resistance presented by film 25 may be utilized to insure against that one switch creating a so-called "dead" short that otherwise might preclude proper operation of the remaining ones of the switches in that group and their associated light device.

When utilized, anisotropically resistive film 25 also assists in affording an additional control variable. In itself, such a film functions to an extent as a lossy transmission line effectively having shunt elements each composed of the series combination of a resistor and a capacitor. By applying a control waveform having a specified rise time, a finite time interval is required for the resulting waveform to propagate from column electrode 21 out to the edge of the light display element. Coupled with the fact that the type of switch element contemplated requires a finite time of field application before it breaks down, the timing of the application of control pulses becomes as additionally available control variable.

FIG. 3*c* is an enlarged representation of a cross-section taken along the line x—x in FIG. 3*a* and reveals in more detail one actual form of construction of a switch 30. In this case, each individual switch includes an active amorphous semi-conductor body 32 sandwiched between a pair of refractory-metal or carbon conductive electrodes 33 and 34, with a further resistive layer 35 being disposed on top of electrode 33. All of these elements 32–35 are disposed within a corresponding one of the apertures in sheet 26. The combination of body 32 and its immediately adjacent electrodes 33 and 34 actually constitute the field-responsive switch. Resistive layer 35 is included as additional insurance against a shorting out of the entire local display device in the event of a permanent breakdown of an individual one of the switches. Moreover, the resistance in series with the electric field path tends to compensate for changes in the electric field pattern that otherwise might occur as each switch becomes conductive.

An alternative and more simplified version of an individual switch is shown in FIG. 3*d*. In this case, an insulating layer 24*d* is disposed only in the region immediately beneath column electrode 21, and the above-discussed anisotropically resistive layer is omitted as is the individual resistive layer associated in FIG. 3*c* with each of the individual switches. Moreover, each of the latter is in itself simplified by including only the active body 32 sandwiched between electrodes 33 and 34, these elements again in the case of each switch 30 being disposed within an aperture through insulating sheet 26*d*. FIGS. 3*c* and 3*d* are intended only to demonstrate by comparison the difference between the comparatively more complex assembly of FIG. 3*c* and the simpler construction represented in FIG. 3*d*. Depending upon the degree of tailoring of the shape of the non-uniformly distributed field desired and the degree of protection to be sought against shorts, any one or more of the additional features of FIG. 3*c* may be incorporated into the version of FIG. 3*d*. Furthermore, it is to be noted that insulating sheet 26 or 26*d* need not be present in direct physical adaptation. That is, the entire assembly may be produced by conventional integrated circuit techniques in which case the insulating sheet is simply the matrix surrounding them. At that the sheet is meant to represent is an electrical separation between the different switches.

As indicated, the material interposed between electrode 21 and switches 30 may be manipulated in order to control the transfer curve of light output as a function of control signal. Moreover, and as already adverted to, care must be taken to insure that a potential applied only to electrode 21, in the absence of a counter-potential applied only to electrode 22, cannot result by itself in activation of an associated switch. To this end, the arrangement of FIG. 3*e* includes a field-shaping conductor 36 interposed between column electrode 21 and switches 30. As shown, conductor 36 is sandwiched between insulating strips 24*e* and 37. It is referenced to the potential on electrode 22 so as to serve as a shield with respect to those of the switches located very near to electrode 21.

With any given combination of different materials, dielectric constants and dimensions, field mapping is necessary in order to select the final arrangement. Moreover, any one layer or film may be contoured or shaped so as to adjust its effect on the resulting field spread pattern. For example, the lateral contour of conductor 36 may be scalloped as shown in FIG. 3*f*.

This permits a reduced field strength to be applied to the nearest ones of switches 30, while not affecting the field as applied to more outlying ones of the switches. Analogously, row electrode 22 may be associated with field-shaping elements.

FIG. 4 illustrates a modification in which the relative positions of the row and column electrodes are, in one sense, reversed. That is, a row electrode 21*a* in this case is oriented to run in the same direction as the direction in which switches 30 are dispersed. On the opposite side of the panel, a row electrode 38 is then run in the orthogonal direction. Insulating layer 24, anisotropically resistive film 25, electroluminescent slab 27 and glass substrate 28 are the same as already described in connection with FIG. 3*a*. In this case, therefore, the resulting electric field is concentrated at row electrode 38 and spreads out in the direction in which switches 30 are distributed or dispersed. The field lines thus are distributed more or less in a manner which would be obtained by inverting the field lines and the positions of electrodes 21 and 22 in FIG. 3*b*.

Figures 4A, 4B, 7A, 7B:
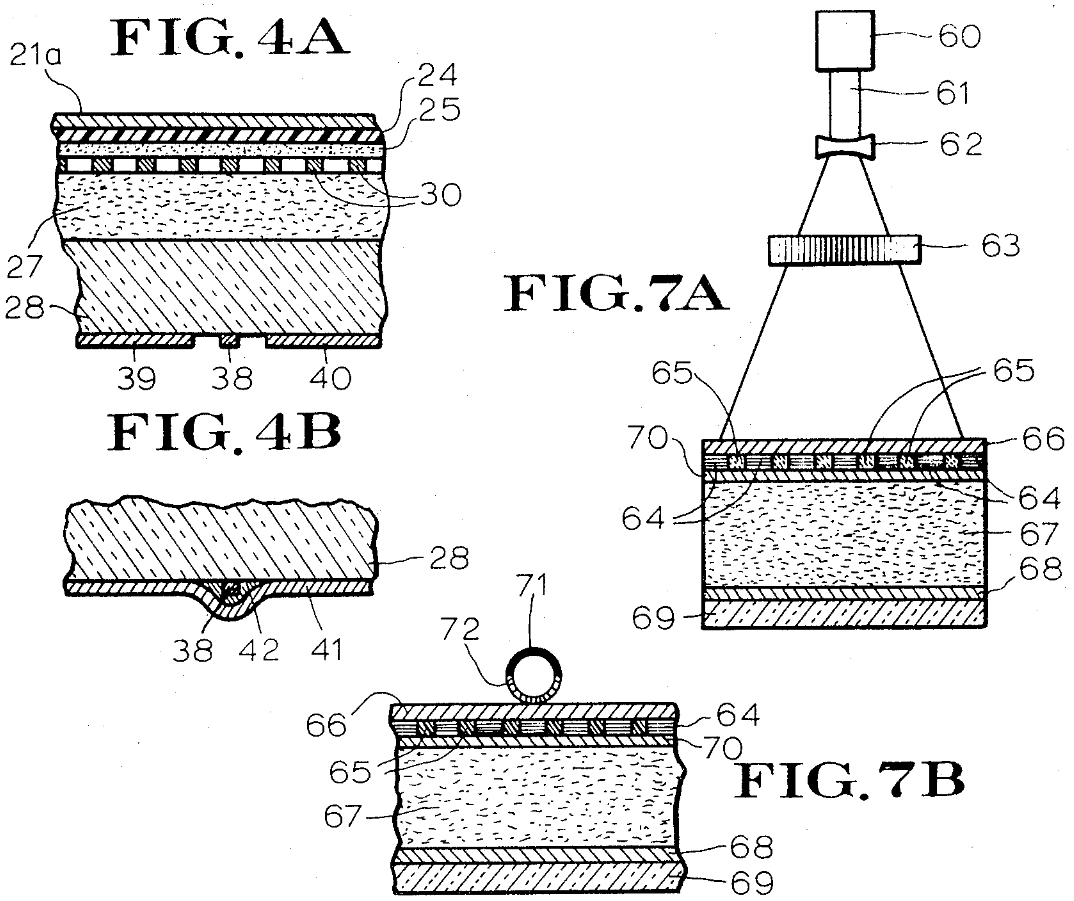

One result of the arrangement of FIG. 4*a*, however, is that the field is more unevenly distributed in its passage through electroluminescent slab 27. In general, this tends to be undesirable with reference to the application of the sustain signal used as described above to maintain the development of light following the addressing and initial energization of each different display device corresponding to a particular picture element. Accordingly, in the arrangement of FIG. 4*a* the subsequent sustain signal is applied between column electrode 21*a*, on the one hand, and a pair of additional electrodes 39 and 40 affixed to substrate 28 and spaced respectively on opposite sides of row electrode 38. Alternatively as shown in FIG. 4*b*, the sustain potential or signal may be applied to an additional electrode 41 which overlies row electrode 38 and is insulated therefrom by a filler 42. In either case, the sustain potential is applied in a manner so as to create a reasonably uniform field distribution, while the switch-actuating field is applied in a manner so as to be non-uniform and thus embrace at any instant a percentage of the total number of switches which is proportional to an applied video level.

Figure 5:
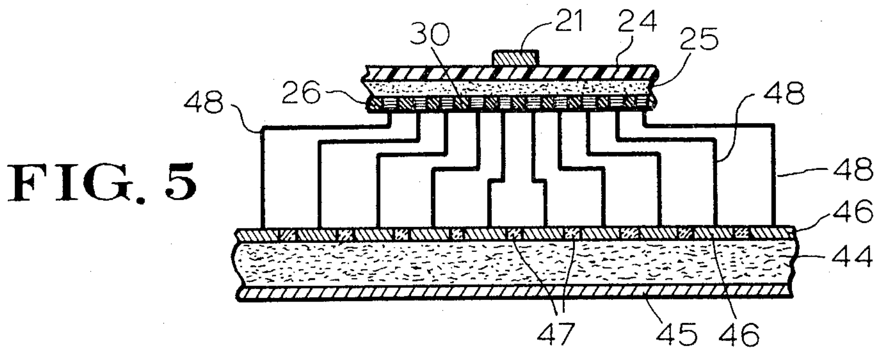
FIG. 5 is a fragmentary cross-sectional view, partly in schematic form, illustrating features of a modified form of image display panel.

In principle, it is not necessary that the individual different switches be geometrically aligned with the corresponding light display element they respectively control. While the different switches as well as their combination with the field-applying row and column electrodes may, with present-day technology, be constructed so as to be of exceedingly minute individual and overal size, it may at the same time be desirable to utilize much larger light display elements in order to obtain adequate light output level. In FIG. 5, accordingly, column electrode 21, layer 24, film 25 and sheet 26, including its distributed switches 30, are the same as in FIG. 3*a*. In this case, however, an electroluminescent layer 44 has a row electrode 45 affixed to its major surface remote from column electrode 21 and, on the opposite surface of slab 44, a plurality of individual conductive electrodes 46 are spaced apart by insulating segments 47 across a surface of slab 44. Electrodes 46 define a plurality of separate effectively individual electroluminescent cells or light display elements. The size of each such separate light display element is much larger in width than the spacing between successive different ones of switches 30. To accommodate this effective spreading of the individual light elements relative to the switches, each individual different switch is connected to a respective one of electrodes 46 by a corresponding electrically conducting lead 48.

As illustrated for explanation in FIG. 5, row electrode 45 serves both as the counterpole to column electrode 21 in the development of the switch-activating field and as the common counterpole for the different ones of electrodes 46 in the energization of the electroluminescent elements. As would, of course, be expected, the different conductive elements between switches 30 and row electrode 45 in the depicted version offer interference with the desired field distribution. Accordingly, an entirely separate and additional counterpole electrode preferably is disposed directly beneath the array of switches 30 to serve as the field-developing counterpole to column electrode 21. In practice, leads 48 may be incorporated in the panel in the same manner as in the conventional fabrication of printed circuitry. In that connection, it is convenient in many cases to dispose the electric field-spreading layout in the plane of the display proper.

Figure 6:
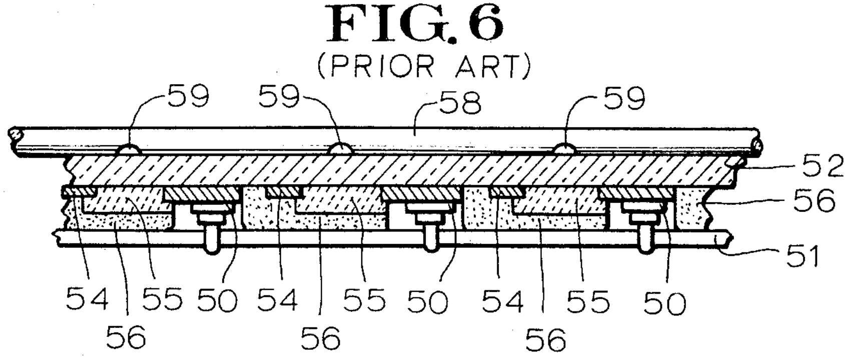
FIG. 6 (PRIOR ART)
FIG. 6 is a fragmentary cross-sectional view of a prior image-display panel.

By way of introduction to the embodiments of FIG. 7*a* and 7*b* to be described below, FIG. 6 is a portion of a prior light display device in which the energization of light output devices, corresponding to the different picture elements in an image, is under the control of an optical field instead of an electric field. As described in more detail in co-pending application Ser. No. 100,240 , filed Dec. 12, 1970 and now U.S. Pat. No. 3,700,802, issued Oct. 24, 1972. and assigned to the same assignee as the present application, the arrangement of FIG. 6 includes a line of injection luminescent diodes 50 having one terminal of each connected to a common conductor 51 and with all the diodes being distributed across a surface of a glass substrate 52. Each individual diode 50 is connected to a conductive strip 54 by a respective photoconductor 55. Filling the substantial remainder of the spaces between the different diodes and conductors is an opaque insulating body 56. Running along the opposite surface of substrate 52 in alignment with the line of diodes 50 is a light pipe 58 having an exit aperture 59 positioned in alignment with each different one of photoconductors 55.

Within light pipe 58, light is channeled by the fiber optic element of the pipe in accordance with the mechanism of total internal reflection created by forming the pipe of a material having an index of refraction greater than that of a surrounding material or medium. Whenever light is channeled into pipe 58, a portion exits from each of apertures 59 and is effective to cause each of the corresponding ones of photoconductors 55 to exhibit a highly conductive condition. At the same time, common conductor 51 is connected to one terminal of a potential source. Accordingly, whichever different one of conductive strips 54 is at any given instant connected by an addressing mechanism to the other terminal of the potential source effects the completion of an energizing circuit to its associated light-emitting diode 50 as a result of which the latter produces light output. With a multiplicity of such lines of elements being repeated throughout a display panel, it will be apparent that scanning in one direction is controlled by switching a light source from one light pipe to the next. Concurrently or sequentially, scanning in the other direction is effected by sequencing the application of the potential source connection to successive different ones of strips 54. With the occurrence of the application of potential to any given one of strips 54 and the injection of light into one of the light pipes intersecting the strip, the light-emitting diode at that intersection is thus activated.

FIG. 7*a* illustrates the principles involved in adapting the multiple switch concept discussed hereinbefore to an approach such as that exemplified by FIG. 6 in which an optical field is employed as at least part of the picture-element addressing technique. Thus, a source 60 projects a beam 61 of light through a divergent lens 62. The divergent optical field is then passed through a graded-opacity filter 63 in which the opacity changes in both directions laterally away from its center. In this manner, a non-uniform optical field is caused to be distributed over an array of photoconductors 64 in a manner generally analogous to the non-uniform distribution of the electric field depicted in FIG. 3*b*. Photoconductors 64 are spaced apart by insulating segments 65 and sandwiched between a transparent electrode 66 and an electroluminescent slab 67. A transparent counter-electrode 68 is sandwiched between the other surface of slab 67 and a glass substrate 69. Finally, an opaque conductive light barrier 70 is sandwiched between slab 67 and photoconductors 64. This layer, of graphite or the like, prevents activation of the photoconductors by light from the electroluminescent materal. Its resistance in the image display plane is sufficiently higher than the resistance perpendicular to that plane as to preclude significant cross-talk between adjacent image elements.

In operation, each of the photoconductors 64 in itself preferably is of the kind which exhibits a threshold. That is, it remains substantially non-conductive until irradiated by an optical field which exceeds some predetermined finite strength. Accordingly, a relatively weak light output from source 60, corresponding to a low level video signal, may effect significant conduction only in the centermost one or two of the array of photoconductors. Consequently, only that central portion of electroluminescent slab 67 is caused to emit light. On the other hand, a maximum-level video signal results in a corresponding optical field strength over the entire array of semi-conductors sufficient to render them all conductive. In turn, all portions of the light output device are then activated.

A more practical construction, analogous to that of FIG. 6, is shown in FIG. 7*b* wherein a light pipe 71 is disposed as a column activator over the assembly composed of the array of photo-conductors 64, barrier 70, electroluminescent slab 67, electrode 68 and substrate 69. Aligned with the position of photoconductor 64 is an aperture 72 in the light pipe which includes a graded-opacity filter. Consequently, the distribution of light from pipe 71 across the array of photoconductors is essentially the same as described in FIG. 7*a*. Thus, once again the total light display device includes a plurality of switches (photoconductors 64) which respond in this case to a non-uniform optical field in order to energize the light output device in an amount proportional to a video signal represented by the intensity of the light input to pipe 71. In a direct alternative, the graded-opacity filter is in the form of a graded layer overlying photoconductors 64. In turn, that function may be included in the characteristics of electrode 66.

In all of the different embodiments described above, together with the various alternatives and modifications, a common feature is that of employing a light display device at each picture element position in an image-display panel and associating therewith a group of mutually dispersed switches. The level of light output from the display device at each picture element position is then a function of the number of switches rendered conductive at any given instant. In turn, that number of switches is directly a result of the level of an applied non-uniform field the strength, and consequent dispersal, of which is related to video signal level. In itself, the light display device may be either a common unit activated at different levels by its associated switches or a combination of display elements each associated with its own respective switch.

As specifically shown and so far described, the embodiments have used row and column conductors on respective opposite sides of the switch and the light-display device. In practice, this is not a necessary limitation. Display panels are known in which the selective electrodes are all disposed on the same side of the active element. Such panels may use energy applied with respect to a common electrode on one side of the panel or applied directly in a major plane defined by the panel.

The various different alternatives and modifications afford substantial selectivity in the manner of final approach to construction as well as permitting the inclusion of such features as insurance against shorts and attainment of an optimally-desired transfer characteristic. Yet, the actual fabrication techniques demanded require essentially no greater level of technical competence than that finding present-day use in connection with the formation of integrated circuits, printed components, thin-film devices and the like.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. In a panel for displaying an image formed of picture elements distributed over said panel in a matrix, the combination comprising:

an effective plurality of light-display devices individually disposed at respective different ones of the positions of said picture elements, each of said devices displaying light in an amount proportional to its level of energization;

a respective different group of mutually dispersed switches located at and associated with each of said devices, each switch within said group being responsive to a predetermined field strength for energizing its associated device;

means for supplying a video signal composed of amplitude-varying picture information together with position-selection signals;

means responsive to said position-selection signals for selectively addressing different ones of said groups of switches;

and contrast means responsive to said video signal for subjecting each addressed group of said switches to a non-uniform field correspondingly dispersed among said switches in an amount proportional to the respective level of said picture information.

2. A display panel as defined in claim 1 in which said matrix is defined by a plurality of elongated conductive elements laterally spaced apart on one side of said panel and a plurality of elongated conductors spaced apart on the opposite side of said panel and individually orthogonal to said conductive elements, and in which said non-uniform field is developed from one of said conductive elements to and along one of said conductors.

3. A display panel as defined in claim 1 in which said contrast means includes a layer of electrically insulative material disposed in the path of said field, the distribution of dielectric impedance of said layer contributing to the determination of the dispersal characteristic of said field.

4. A display panel as defined in claim 1 in which said contrast means includes a layer of resistive material disposed in the path of said field.

5. A display panel as defined in claim 4 in which said layer exhibits resistance to said field anisotropically, the resistance being higher in the direction of the plane defined by said layer than in the direction normal to said plane.

6. A display panel as defined in claim 1 which includes a layer of perforated insulating material, and in which individually different ones of said switches are disposed in respective different ones of the perforations in said layer.

7. A display panel as defined in claim 6 in which each of said switches includes an active field-responsive substance sandwiched between a pair of conductive electrodes.

8. A display panel as defined in claim 7 in which each of said switches also includes a resistive element disposed in the path of said field through said active substance and said conductive electrodes.

9. A display panel as defined in claim 1 in which said contrast means includes a narrow electrode on one side of each group and a comparatively wider electrode, in the direction of field dispersal, on the other side of each group, said field dispersing by spreading apart from said one electrode to said other electrode.

10. A display panel as defined in claim 9 in which said light display devices are disposed on one side of said switches;
- in which said narrow electrode is on the side of said switches opposite said devices;
- and in which said wider electrode is on the side of said devices opposite said switches.

11. A display panel as defined in claim 9 in which said light-display devices are disposed on one side of said switches;
- in which said wider electrode is on the side of said switches opposite said devices;
- and in which said narrow electrode is on the side of said devices opposite said switches.

12. A display panel as defined in claim 11 which further includes:
- means for sustaining energization of said display devices subsequent to activation by said field, including additional electrodes spaced from said narrow electrode on the side of said devices opposite said switches.

13. A display panel as defined in claim 11 which further includes:
- means for sustaining energization of said display devices subsequent to activation by said field, including an additional electrode overlying and insulated from said narrow electrode.

14. A display panel as defined in claim 1 which further includes means for sustaining energization of said display devices subsequent to activation by said field.

15. A display panel as defined in claim 1 in which said switches are dispersed over a given area;
- in which associated portions of each light-display device are dispersed over a predetermined area much larger than said given area;
- and in which a plurality of conductors individually couple respective ones of said switches to corresponding ones of said portions.

16. A display panel as defined in claim 1 in which said field is electric.

17. A display panel as defined in claim 1 in which said field is composed of optical radiation.

18. A display panel as defined in claim 17 in which said addressing means includes optical-radiation delivery elements;
- in which said delivery elements include a plurality of graded-opacity output ports individually associated with respective different ones of said switches;
- and in which said switches are responsive to said optical radiation.

19. A display panel as defined in claim 17 in which said addressing means includes optical-radiation delivery elements;
- in which said switches are responsive to said optical radiation;
- and in which a graded-opacity filter is disposed in the light paths between said delivery elements and said switches.

20. A display panel as defined in claim 1 in which each group of said switches includes a layer of amorphous semiconductor material.

21. A display panel as defined in claim 1 which further includes means disposed in said field for modifying the dispersal characteristic thereof.

22. A display panel as defined in claim 20 in which said modifying means includes an electrically shielding electrode disposed in the path of said field and attenuating the strength of said field applied to the ones of said switches nearest said subjecting means.

* * * * *

UNITED STATES PATENT OFFICE
CERTIFICATE OF CORRECTION

Patent No. 3,743,773 Dated July 3, 1973

Inventor(s) Alan Sobel

It is certified that error appears in the above-identified patent and that said Letters Patent are hereby corrected as shown below:

Column 8, line 42, delete "At" and insert -- All --.

Signed and sealed this 21st day of May 1974.

(SEAL)
Attest:

EDWARD M.FLETCHER,JR.
Attesting Officer

C. MARSHALL DANN
Commissioner of Patents